United States Patent [19]
Chattha

[11] Patent Number: 4,493,914
[45] Date of Patent: Jan. 15, 1985

[54] STABILIZED DISPERSION OF CROSS-LINKED POLYMER PARTICLES

[75] Inventor: Mohinder S. Chattha, Livonia, Mich.

[73] Assignee: Ford Motor Company, Dearborn, Mich.

[21] Appl. No.: 468,902

[22] Filed: Feb. 23, 1983

[51] Int. Cl.$^3$ .......................... C08J 3/26; C08K 5/01; C08K 5/06; C08L 63/10
[52] U.S. Cl. .................................. 523/436; 523/437; 523/456; 523/463; 524/923; 525/528
[58] Field of Search ........................ 525/528; 524/923; 523/436, 437, 456, 463

[56] References Cited

U.S. PATENT DOCUMENTS

| | | | |
|---|---|---|---|
| 3,317,635 | 5/1967 | Osmond et al. | 525/296 |
| 3,383,352 | 5/1968 | Duell et al. | 525/63 |
| 3,514,500 | 5/1970 | Osmond et al. | 526/202 |
| 3,607,821 | 9/1971 | Franks et al. | 524/529 |
| 3,666,710 | 5/1972 | Makhlouf et al. | 524/461 |
| 3,686,111 | 8/1972 | Makhlouf et al. | 524/530 |
| 3,876,603 | 4/1975 | Makhlouf | 523/210 |
| 3,880,796 | 4/1975 | Christenson et al. | 524/461 |
| 3,966,667 | 6/1976 | Sullivan et al. | 524/474 |
| 4,025,474 | 5/1977 | Porter, Jr. et al. | 528/245.5 |
| 4,055,607 | 10/1977 | Sullivan et al. | 525/155 |
| 4,075,141 | 2/1978 | Porter, Jr. et al. | 524/56 |
| 4,115,472 | 9/1978 | Porter, Jr. et al. | 525/66 |
| 4,147,688 | 4/1979 | Makhlouf et al. | 524/461 |
| 4,180,619 | 12/1979 | Makhlouf et al. | 526/202 |
| 4,242,384 | 12/1980 | Andrew et al. | 427/421 |

FOREIGN PATENT DOCUMENTS 1156235  6/1969  United Kingdom.

OTHER PUBLICATIONS

Waite, J. Oil Col. Chem. Assoc., 1971 S4, pp. 342–350.

Primary Examiner—Alan M. Lieberman
Attorney, Agent, or Firm—Lorraine S. Melotik; Roger L. May

[57] ABSTRACT

Crosslinked, preferably acrylic, preferably melamine crosslinked, polymer particles formed by reactions comprising free radical addition polymerization of:
(a) between about 0.5 and about 20 weight percent each of first and second monomers, each bearing functionality capable of crosslinking reaction with the other, wherein (i) either both additionally are ethylenically unsaturated monomers or (ii) the first monomer additionally is ethylenically unsaturated and the second monomer bears multiple crosslinking functionality and no ethylenic unsaturation; and
(b) between about 60 and about 99 weight percent of at least one other monoethylenically unsaturated monomer;

in the presence of (I) an organic liquid which is a solvent for the polymerizable monomers, but a non-solvent for the resultant polymer, and (II) polymeric dispersion stabilizer bearing, on the average, more than one long chain non-polar hydrocarbon molecules and at least one pendant vinyl unsaturation.

13 Claims, No Drawings

STABILIZED DISPERSION OF CROSS-LINKED POLYMER PARTICLES

Reference is made to commonly assigned related U.S. applications Ser. No. 455,696 entitled "Non-aqueous Dispersions Based on Capped Stabilizers and Reactants Comprising Polyfunctional Monomers II", Ser. No. 455,687 entitled "Non-aqueous Dispersions Based on Capped Stabilizers and Vinyl Monomers II", Ser. No. 455,701 entitled "Non-aqueous Dispersions Based on Capped Stabilizers and Reactants Comprising Polyfunctional Monomers I". and Ser. No. 465,856 entitled "Non-aqueous Dispersions Based on Capped Stabilizers and Vinyl Monomers I", all to Theodore et al, and filed on Jan. 5, 1983. Further reference is made to commonly assigned related U.S. applications Ser. No. 468,901 entitled "Preparation of Non-aqueous Dispersions with use of Monofunctional Stabilizer" to Chattha et al and Ser. No. 468,912 entitled "Crosslinked Flow Control Additives for High Solids Paints I" to Cassatta et al; both filed Feb. 23, 1983.

TECHNICAL FIELD

This invention relates to stable, crosslinked polymer particles and non-aqueous dispersions containing such particles. More particularly, the invention relates to such stable crosslinked, preferably acrylic, preferably melamine crosslinked, polymer particles prepared in the presence of a polymeric dispersion stabilizer comprising an adduct having, on the average, more than one long non-polar hydrocarbon chain and at least one pendant vinyl unsaturation.

BACKGROUND ART

Suitable crosslinked acrylic polymer particles of the type which may employ the stabilizer of this invention are well known. U.S. Pat. No. 4,147,688 to Makhlouf et al. teaches crosslinked dispersions wherein crosslinked acrylic polymer microgel particles are formed by free radical addition polymerization of alpha, beta ethylenically unsaturated monocarboxylic acid, at least one other copolymerizable monoethylenically unsaturated monomer and a certain percentage of crosslinking monomer, in the presence of a hydrocarbon dispersing liquid (See abstract, examples and claims). Other crosslinked dispersions containing microgel particles are disclosed in the patent application and patents referred to in the Makhlouf et al disclosure.

U.S. Pat. No. 4,025,474 to Porter et al discloses a polyester based coating composition which includes the crosslinked dispersions disclosed by Makhlouf et al. U.S. Pat. No. 4,075,141 to Porter et al discloses carboxylic acid amide interpolymer-based coating compositions including the same crosslinked dispersions. U.S. Pat. No. 4,115,472 also to Porter et al, discloses urethane coating compositions also including the crosslinked dispersions of Makhlouf et al. U.S. Pat. No. 4,055,607 to Sullivan et al discloses thermosetting compositions of (a) solution acrylic polymer, (b) at least 0.5% of microgel particles formed by polymerizing hydroxyl bearing monomers with non-hydroxyl bearing monomers in the presence of the stabilizer disclosed by Makhlouf et al, and (c) melamine resin. The microgel dispersion of Sullivan et al thus contains functionality capable of reacting with the melamine crosslinking agent.

The dispersion stabilizer employed in producing the microgel particles of the Makhlouf et al compositions are generally polymeric and contain at least two segments, with one segment being solvated by the dispersion liquid and the second segment being of different polarity than the first segment, and relatively insoluble, compared to the first segment, in the dispersing medium. Included among the dispersion stabilizers referred to in the Makhlouf et al patent are polyacrylates and methacrylates, such as poly(lauryl)methacrylate and poly(2-ethylhexylacrylateacrylate); diene polymers and copolymers such as polybutadiene and degraded rubbers; aminoplast resins, particularly high naphtha-tolerant compounds such as melamine formaldehyde resins etherified with higher alcohols (e.g., alcohols having 4 to 12 carbon atoms); and various copolymers designed to have desired characteristics (see Col. 5, lines 1–27).

Among the numerous dispersion stabilizers, which could be employed in compositions of Makhlouf et al are those taught by U.S. Pat. No. 3,607,821 to Clarke. Clarke teaches a stabilizer for non-aqueous dispersions wherein the stabilizer is chemically reacted with dispersed particles of the dispersion (Col. 1, lines 36–42). Each co-reactant stabilizer molecule forms from 1 to 10 (preferably 1 to 4) covalent links with the dispersed polymer (Col. 1, lines 50–52). The covalent links between the stabilizer and the dispersed polymer are formed by reaction between chemical groups provided by the stabilizer and complementary chemical groups provided by the dispersed polymer or by copolymerization reaction (Col. 1, lines 63–67).

Particularly preferred dispersion stabilizers of Makhlouf et al and the general type of stabilizer employed in the preparation of particles of this invention are those comprising two segments with one segment being a polymeric segment solvated by the dispersion liquid and not associated with polymerized particles of the polymerizable ethylenically unsaturated monomers and the second segment being an anchor segment of different polarity from the first type and relatively non-solvatable by the hydrocarbon solvent and capable of anchoring with the polymerized particles of the ethylenically unsaturated monomer. This anchor segment contains pendant groups capable of copolymerizing with the ethylenically unsaturated monomers used to form the particles of the dispersion (See Col. 5, lines 28–40 of Makhlouf et al).

DISCLOSURE OF THE INVENTION

The crosslinked stable polymer particles of this invention are characterized in that they are formed by reactions comprising the addition polymerization of:

(a) between about 0.5 and about 20 weight percent each of a first and second monomer being (i) first and second ethylenically unsaturated monomers each bearing functionality capable of crosslinking reaction with the other, or (ii) first and second monomers wherein the first monomer bears ethylenic unsaturation and functionality capable of crosslinking reaction with other functionality present on the second monomer bearing multiple other functionality and bearing no ethylenic unsaturation; and (b) between about 99 and about 60 weight percent of at least one other monoethylenically unsaturated monomer, in the presence of (I) an organic liquid which is a solvent for the polymerizable monomers, but a non-solvent for the resultant polymer, and (II) polymeric dispersion stabilizer, wherein the reaction is carried out at elevated temperatures such that the dispersion polymer first forms and then is crosslinked.

The dispersion stabilizer employed in the particle formation of this invention is the reaction product of:

(A) an adduct bearing pendant hydroxyl groups and being the reaction product of:
  (a) long chain hydrocarbon molecules bearing a carboxyl group, preferably a terminal carboxyl group; and
  (b) polyepoxide resin having (i) at least two, preferably on the average two, epoxide groups and (ii) a number average molecular weight ($\overline{M_n}$) of between about 140 and 3000, preferably between about 300 and about 2,000, reacted in amounts so as to provide greater than about 1.0 mole of the long chain hydrocarbon molecules bearing a carboxyl group for each mole of the polyepoxide resin; and (B) ethylenically unsaturated monoisocyanates, wherein the adduct and the ethylenically unsaturated monoisocyanates are reacted in amounts so as to provide at least about 1.0 moles of the isocyanate (B) for each mole of the polyepoxide resin.

The invention is also directed to non-aqueous dispersions of such particles as well as compositions containing such particles.

One of the serious disadvantages of the aforementioned prior art systems of particle formation is the inherent restriction placed on the selection of suitable monomers which can be employed therein. This restriction results from the use of a first segment precursor which generally contains also different terminal functional groups, each of which is capable of reaction. Since it is desired therein to react only one of these groups, the selection of monomers which can be employed during stabilizer and particle formation is limited. Additionally, the presence of the unreacted terminal polar functional group on the first segment diminishes the desired non-polarity of this segment.

We have now found that by employing a first segment precursor having only one reactive functional group, i.e., a carboxyl group, per molecule in accordance with the teachings of this invention, the aforementioned disadvantages can be effectively eliminated, thereby allowing the formation of a more distinctly non-polar first segment and the use of other monomers such as isocyanates (both in stabilizer and particle formation) and melamines for particle formation which advantageously offer more rapid, complete reactions and simpler process conditions.

Also advantageously, the use of polyepoxide materials in stabilizer formation generates stabilizers which contain, on the average, more than one long non-polar first segment so that less of such stabilizer is generally required in particle formation than those of prior art systems.

BEST MODE OF THE INVENTION

The polymeric dispersion stabilizer of the invention, as described above, comprises an adduct bearing pendant hydroxyl groups which is formed by reaction of a long chain hydrocarbon molecule bearing a carboxyl group with polyepoxide compounds generally in the presence of a catalyst, whereby the hydroxyl of the —COOH opens the epoxide rings of the polyepoxide generating hydroxyl groups while forming the adduct. The hydrocarbon molecule and the polyepoxide resin are reacted in amounts so as to provide greater than about 1.0 mole of hydrocarbon molecules for each mole of the polyepoxide resin, i.e., so as to form an adduct having, on the average, more than one of such long hydrocarbon chains. However, the long chain hydrocarbon molecule may be reacted with the polyepoxide resin in amounts up to that providing about 1.0 mole of long chain hydrocarbon molecule for each mole of epoxide groups present on the polyepoxide resin, i.e., so as to react essentially all of the epoxide group of the polyepoxide resin with long chain hydrocarbon molecules. Preferably, the carboxyl of the long chain hydrocarbon is a terminal carboxyl group and the molecule preferably has a number average molecular weight ($M_n$) in the range of between about 350 and about 3300, more preferably between about 1500 and about 2500. Included among such molecules, i.e., first segment precursors, are capped condensation polymers. The capped condensation polymers are obtained from uncapped polymers. Such uncapped polymers may be made, for example, by condensation reactions producing a polyester or polyether. The most convenient monomers to use are hydroxy acids or lactones. The hydroxy acids self-condense to form hydroxy acid polymers. In such cases, wherein the resultant polymer contains another reactive group per molecule in addition to the carboxyl group, the polymers are subsequently capped, i.e., the other functional groups is reacted (blocked) so as to leave only the carboxyl group on the polymer. For example, a hydroxy fatty acid such as 12-hydroxystearic acid may be self-condensed to form poly(12-hydroxystearic acid), which is then capped by reaction with e.g., an alkyl monocarboxylic acid. In this embodiment, the carboxyl group of the monocarboxylic acid reacts with the hydroxyl group of the poly(12-hydroxystearic acid) leaving only one reactive group, the carboxyl group, on the polymer. These reactions, the self-condensation and capping may be carried out in situ with singularly combined materials or in two steps as would be apparent to one skilled in the art.

Somewhat more complex, but still useful polyesters may be made by reacting diacids with diols. For example, 1,12-dodecanediol may be reacted with sebacic acid or its diacid chloride to form a component which could then be capped and employed as described above.

As would be apparent to one skilled in the art, a variety of capping materials may be employed in the subject invention, whose selection would be dependent on the particular functional group to be capped. In the embodiment wherein poly(12-hydroxystearic acid) is employed and it is desired to react (cap) the terminal hydroxyl group, suitable capping material would include alkyl monocarboxylic acids and alkyl isocyanates, with aliphatic monocarboxylic acids being preferred. Preferably, the alkyl group of these capping materials comprises $C_3$–$C_{17}$ carbon atoms.

The polyepoxide resin used in this invention has a number average molecular weight ($M_n$) of between about 140 and about 3,000, preferably between about 300 and about 2,000.

The term polyepoxide resin as used herein means epoxide compounds or polymers containing 2 or more epoxide groups wherein this polyepoxide may be substituting with non-interfering functionality such as hydroxyl. Preferably, this resin contains, on the average, about 2 epoxide groups per molecule.

Polyepoxide resins useful in the invention are preferably selected from aliphatic, cycloaliphatic and aromatic polyepoxides falling within the stated molecular weight range. Such polyepoxides are well known compositions and any of these may be employed in the coatings of the invention. Among the many suitable types of polyepoxides are those disclosed by U.S. Pat. Nos. 3,404,018; 2,528,359; 2,528,360; 3,198,850; 3,960,979; and 4,018,848.

U.S. Pat. No. 3,404,018 discloses several particularly suitable types of polyepoxides including: (1) polyglycidyl ethers of polyhydric alcohols and polyhydric phenols; (2) epoxidized esters of polyethylenically unsaturated monocarboxylic acids; (3) glycidyl esters of polybasic acids; (4) epoxidized esters of unsaturated monohydric alcohols and polycarboxyl acids; and (5) epoxidized polymers and copolymers of diolefins. Such materials are commercially available, for example, as Epon 828 and 830 (Shell Chemical Co.) and Araldite 6010 and 6020 (Ciba-Geigy). Many polyepoxides other than those recited in this or other referenced patents will be apparent to those skilled in the art.

Compatible mixtures of any of these polyepoxide resins are also suitable.

Preferred catalysts useful in catalyzing the carboxyl-/epoxide reaction include the tetralkyl ammonium salts such as tetra methyl ammonium chloride, tetraethyl ammonium bromide and trimethyl benzyl ammonium chloride as well as metal salts of a carboxylic acid, such as potassium octoate or chromium III octoate. Other useful catalyst include: metal halides such as chromium trichloride, ferric trichloride, and aluminum trichloride; mercaptans and thioethers such as octyl mercaptan, dimercapto propanol and dimercapto-diethyl ether; tertiary amines such as triethyl amine, pyridine, dimethylandine, quinoline, B-picoline, ethylpyridine; and the like. Still other catalyst known to catalyze carboxy/epoxy reactions will be apparent to those skilled in the art.

As had been discussed above, the dispersion stabilizer of this invention contains one segment which is solvated by the dispersing liquid and a second segment, an anchor segment, of different polarity than the first segment and relatively insoluble in the dispersing liquid. The first segment of this stabilizer comprises the long hydrocarbon chains and the second anchor segment comprises the above mentioned pendant vinyl groups, which may react with ethylenically unsaturated monomers in the copolymerization process with the monomers used to make the crosslinked dispersed particles. In this way the anchor portion of the stabilizer chemically associates with the polymer particles. Preferably such chemical reaction is by way of addition copolymerization with the ethylenically unsaturated monomers used in the preparation of the crosslinked particles through ethylenic unsaturation on the anchor segment of the polymeric dispersion stabilizer, however such reaction may include that between other reactive groups respectively present on the particle monomers and anchor segment, as e.g., hydroxyl, carboxyl, isocyanate, etc.

As a result of the long chain hydrocarbon molecule-polyepoxide reaction, in particular by means of the carboxyl-epoxide reaction, hydroxyl groups have been generated on the epoxy. By reactions with these hydroxyls (or with hydroxyls which may be initially present on the polyepoxide resin, vinyl groups may be added to the adduct. The addition of the pendant vinyl groups, i.e., ethylenic unsaturation, to the adduct (A) proceeds through reaction of at least one of the hydroxyl groups on the adduct with an ethylenically unsaturated monoisocyanate. Thus, by means of this reaction, ethylenic unsaturation is added to the stabilizer through the lengthening of the pendant hydroxyl group on the adduct.

The unsaturated isocyanate useful in the stabilizer formation of this invention to add ethylenic unsaturation thereto comprises ethylenically unsaturated monoisocyanates, i.e., containing one reactive isocyanate functional group per molecule and containing ethylenic unsaturation. Preferably they are monoethylenically unsaturated monoisocyanates and most preferably contain alpha-beta monoethylenic unsaturation, i.e., bear olefinic unsaturation between the two carbon atoms in the alpha-beta positions with respect to the terminus of an aliphatic carbon-to-carbon chain. Exemplary of such isocyanates which may be employed in the stabilizer formation of the invention of this application are isocyanatoethyl methacrylate, the reaction product of isophone diisocyanate (IPDI) and hydroxyethyl or hydroxypropyl methacrylate, and the reaction product of IPDI and acrylic or methacrylic acid, with isocyanatoethyl methacrylate being preferred.

The unsaturated monoisocyanate is employed in stabilizer formation in an amount sufficient to provide at least about 1.0 moles of monoisocyanate for each mole of polyepoxide resin employed to form the adduct. Thus, the stabilizer will contain at least one pendant vinyl group per stabilizer molecule, which pendant group is capable of copolymerizing with the ethylenically unsaturated monomers employed in particle formation. While according to this invention, at least one pendant vinyl group is present on the stabilizer as a result of the lengthening (reaction) of at least one pendant hydroxyl group of the adduct (with monoisocyanate), more than one pendant vinyl group may be present on the adduct through lengthening of more than one such hydroxyl group. Therefore, in stabilizer formation, while the monoisocyanate is employed in stabilizer formation in amounts necessary to provide at least one mole of monoisocyanate per mole of polyepoxide resin, the monoisocyanate may be employed in amounts up to that necessary to provide about 1 mole of monoisocyanate (B) for each mole of hydroxy groups present on the adduct (A) used to form the stabilizer, i.e., up to that amount of monoisocyanate (B) necessary to react essentially all of the hydroxy group on the adduct according to the invention of this application.

Effective catalyst for the isocyanate-hydroxyl reaction include such organotive compounds as stannous octoate, stannus oleate, dibutyltin dilaurate, and dibutyltin di-2-ethylhexoate. Suitable other catalyst are well known in the art.

The stabilizer is employed in particle formation generally in about a 10–40 weight percent based on the weight of the monomers employed to form the particle.

The crosslinked particles, formed in the presence of the above described stabilizer, are formed by addition polymerization, of (a) between about 0.5 and about 20 weight percent each of a first and second monomer, wherein the first monomer bears ethylenic unsaturation and functionality capable of crosslinking reaction with other functionality present on the second monomer, wherein the second monomer is selected from the group consisting essentially of (1) monomers being monofunctional with respect to this crosslinking functionality and additionally containing ethylenic unsaturation and (2) monomers being polyfunctional with respect to this crosslinking functionality (i.e., having two or more, preferably three such functionalities) and containing no ethylenic unsaturation, and (b) between about 99 and about 60 weight percent of at least one other monoethylenically unsaturated monomer.

The pairs of crosslinking functionalities on the first and second monomers (a) in this type of particle formation can be selected from a wide variety of functionalities which will be apparent to those skilled in the art. Among the preferred pairs of crosslinking functionalities which may be present on the first and second monomers are: hydroxyl and isocyanate; acid and epoxide; epoxide and amine; hydroxyl and amine; acid anhydride and mercaptan; hemiformal and amide; carbonate and amine; cycloimide and amine; cycloimide and hydroxyl; imine and alkoxysilane; etc. The order of the functionalities within the monomer pairs is not meant to be limiting. For example, the functionality pair "hydroxyl and isocyanate" can reflect that the crosslinking functionality of the first monomer is hydroxyl and that the crosslinking functionality of the second monomer is isocyanate; or that the crosslinking functionality of the first monomer is isocyanate and that the crosslinking functionality of the second monomer is hydroxyl. Thus the terms "first" and "second" monomers are merely designations indicating that two different monomers (a) are employed according to the limitations set out for these two different monomers above.

While the first and second monomers (a) may be any monomer within the scope of such term (i.e., any monomers at least one of which bears ethylenic unsaturation, including doubly unsaturated monomers such as butadiene and which is capable of polymerizing in vinyl-type manner), it is preferred that the ethylenically unsaturated monomers be acrylic monomers (i.e., monomers based on acrylic, methacrylic or ethacrylic acids).

Exemplary of such first and second monomers which may be employed in particle formation include, but are not limited to, unsaturated glycidyl monomer and unsaturated acid, e.g., glycidyl (meth)acrylates and (meth)acrylic acid; unsaturated monoisocyanates and unsaturated hydroxy monomers, e.g., isocyanatoethyl methacrylate and hydroxyethyl methacrylate; hydroxy unsaturated monomers and multifunctional amines, e.g., hydroxyethyl methacrylate and melamine resins; hydroxy unsaturated monomers and multifunctional isocyanates, e.g., hydroxy ethyl methacrylate and tri-isocyanates; unsaturated acid monomer and polyfunctional epoxides, e.g., methacrylic acid and diepoxides; unsaturated epoxy monomers and polyacids, e.g., glycidyl methacrylate and azelaic acid; etc. One particular preferred embodiment of the first and second monomers employed to form the particle are hydroxyethyl acrylate and melamine resins. Some types of these particles, i.e., based on first and second ethylenically unsaturated monofunctional monomers, are discussed in the Markholf et al patent, the disclosure of which is hereby incorporated by reference.

Optionally, a minor amount of a first and/or second monomer, as described above, may be replaced by another of the first or second monomers, e.g., in place of some glycidyl methacrylate in reaction with acrylic acid, a minor amount of a diepoxide may be employed, or in place of hydroxyethyl methacrylate in reaction with melamine, a minor amount of glycidyl methacrylate and methacrylic acid may be employed. Also, other of these first and second monomers may be employed in addition to the first and second monomer, e.g., melamine may be employed in addition to glycidyl methacrylate and diacid.

Various other monoethylenically unsaturated monomers (b) may be copolymerized with the monomers in the preparation of the crosslinked dispersed particles. Although essentially any copolymerizable monoethylenically unsaturated monomer may be utilized, depending upon the properties desired, the preferred monoethylenically unsaturated monomers are the alkyl esters of acrylic or methacrylic acid, particularly those having about 1 to about 4 carbons in the alkyl group. Representative of such compounds are alkyl acrylates, such as methacrylate, ethyl methacrylate, propyl methacrylate and butyl methacrylate. Other ethylenically unsaturated monomers which may be advantageously employed include, for example, the vinyl aromatic hydrocarbons, such as styrene, ethyl-methyl styrene, vinyl toluene, unsaturated esters of organic and inorganic acids, such as vinyl acetate, vinyl chloride and the like, and the unsaturated nitriles, such as acrylonitrile, methacrylonitrile, ethacrylonitrile and the like.

One embodiment of crosslinked polymer particles within the scope of the invention is formed by reaction comprising free radical addition copolymerization, in the presence of the dispersion stabilizer and in the presence of hydrocarbon dispersion liquid of: from about 0.8 to about 10, preferably from about 1.0 to about 8.0 weight percent of ethylenically unsaturated hydroxy monomers, from about 1.0 to about 12, preferably from about 1.5 to about 10 weight percent of a crosslinking monomer selected from the group consisting of ethylenically unsaturated isocyanates, and from about 98.2 to about 78, preferably from about 97.5 to about 82 weight percent of at least one other copolymerizable monoethylenically unsaturated monomer.

Although numerous ethylenically unsaturated isocyanates will come to the mind of those skilled in the art, including those discussed above, representative of the most preferred isocyanate for forming this embodiment of preferred crosslinked particles are isocyanatoethyl methacrylate, the reaction product of isophorone diisocyanate (IPDI) and hydroxyethyl or hydroxypropyl methacrylate, and the reaction product of IPDI and acrylic or methacrylic acid, with isocyanatoethyl methacrylate being preferred.

Another, still more preferred embodiment of crosslinked polymer particles within the scope of the invention is formed by reactions comprising free radical addition copolymerization, in the presence of the dispersion stabilizer and in the presence of a hydrocarbon dispersing liquid, of from about 0.5 to about 20 weight percent, preferably from about 2 to about 10 weight percent of ethylenically unsaturated hydroxy monomers, from about 0.5 to about 20 weight percent, preferably from about 2 to about 10 weight percent of a crosslinking monomer selected from the group consisting of amine-aldehyde resins, and from about 99 to about 60, preferably from about 96 to about 80 weight percent of at least one other copolymerizable monoethylenically unsaturated monomer.

Amine-aldehyde crosslinking agents suitable for crosslinking hydroxy functional bearing materials are well known in the art. Typically, these crosslinking materials are products of reactions of melamine, or urea with formaldehyde and various alcohols containing up to an including 4 carbon atoms. Preferably, the amine-aldehyde crosslinking agents useful in this invention with ethylenically unsaturated hydroxy monomers in particle formation are condensation products of formaldehyde with melamine, substituted melamine, urea, benzoguanamine or substituted benzoguanamine. Preferred members of this class are methylated melamine-formaldehyde resins such as hexamethoxymethylmelamine.

Particularly preferred of such amine-aldehyde crosslinking agents useful for particle formation in the invention of this application are sold by American Cyanamid under the trademark "Cymel". In particular, Cymel 301, Cymel 303 and Cymel 325 which are alkylated melamine formaldehyde resins, are useful in forming the particles of this invention.

Although numerous ethylenically unsaturated hydroxy monomers are known to those skilled in the art, the preferred ethylenically unsaturated hydroxy monomers for use in either of these preferred embodiments of crosslinked particle formation are hydroxy functional acrylates and methacrylates, particularly $C_5$-$C_{12}$ esters of acrylic or methacrylic acid bearing hydroxyl functionality. Suitable examples include 2-hydroxyethyl acrylate; 3-chloro-2-hydroxypropyl acrylate; 2-hydroxy-1-methylethyl acrylate; 2-hydroxypropyl acrylate; 3-hydroxy-propyl acrylate; 2-hydroxybutyl acrylate; 4-hydroxybutyl acrylate; diethyleneglycol acrylate; 5-hydroxypentyl acrylate; 6-hydroxyhexyl acrylate; triethyleneglycol acrylate; 7-hydroxyhepyl acrylate; 2-hydroxymethyl methacrylate; 3-chloro-2-hydroxypropyl methacrylate; 2-hydroxy-1-methylethyl methacrylate; 2-hydroxypropyl methacrylate; 3-hydroxypropyl methacrylate; 2-hydroxybutyl methacrylate; 4-hydroxybutyl methacrylate; 5-hydroxypentyl methacrylate; 6-hydroxyhexyl methacrylate; 1,3-dimethyl-3-hydroxybutyl methacrylate; and 7-hydroxyheptyl methacrylate; methacrylates being preferred, with hydroxyethyl methacrylate being most preferred.

The other monoethylenically unsaturated monomer most preferably employed in these preferred embodiments of particle formation is methyl methacrylate.

As mentioned above, the particles are formed in the presence of an organic liquid which is a solvent for the polymerizable monomers but a non-solvent for the resultant polymer. Preferred of such solvents are nonpolar aliphatic solvents including, but not limited to, petroleum ether, aliphatic naptha having a distillation range above 85° C., pentane, hexane, heptane, octane, 2,2,4-trimethylpentane, isooctane, cyclohexane, cyclopeptane, cyclooctane and nonane.

The particles of this invention can be left as dispersions in the solvent employed in particle formation or the solvent employed in particle formation can be removed, leaving the particles in a powder form. These particles, when present as a dispersion in the solvent or as a dry powder, can be employed as flow control agents in liquid system coatings, for example, in such as those taught in U.S. application Ser. No. 334,683 to Chattha and Theodore and Ser. Nos. 334,685, 334,799 all filed Dec. 28, 1981. The powdered particles formed according to this invention have also been found useful as flow control agents in powder coatings.

INDUSTRIAL APPLICABILITY

It should be apparent from the foregoing, that the particles of this invention find application in coatings as, for example, flow control agents.

The following examples are presented by way of description of the composition of the invention and set forth the best mode contemplated by the inventors but are not to be construed as limiting.

EXAMPLE 1

(A) 12-hydroxystearic acid (2410.00 g) and xylene (500.00 g) are heated to obtain a solution. Tetraisopropyl titanate (1.50 g, Tyzor TPT, Dupont) is added to the solution and refluxed for 30 hours under a Dean-Stark water separator to collect 106.00 g water. Fifty grams of stearic acid are added to the reaction mixture and refluxing is continued for ten hours until no more water is collected. Infrared spectrum of product shows complete disappearance of the hydroxy absorption band. The molecular weight ($M_w/M_n$) of product is 4195/2110=1.99. 1,4-butanediol diglycidyl ether (153.5 g) and Cordova Accelerator $AMC^{TM}$-2 (7.2 g) (trademark of and available from Cordova Chemical Company) are added to the above oligomer solution, which is then stirred at 100° C. for 24 hours.

Five hundred grams of the above product, 1 g dibutyltin dilaurate and 35.5 g isocyanatoethyl methacrylate are placed under nitrogen and stirred at 60° C. for five hours.

Thirty-two grams of the above product, 5 g hydroxyethyl methacrylate, 5 g Cymel 301 and 0.04 g phenyl acid phosphate are dissolved in 93 g methyl methacrylate. A solution of 1 g 2,2'-azobis-(2-methylmethyl propionitrile) (AIBN) in 5 ml acetone is added to the above solution and the resulting solution is added dropwise to 600 ml refluxing naphtha (bp 120°-140° C.) with continuous stirring unnder nitrogen. After the addition is complete, the reaction mixture is refluxed for one hour and a solution of 0.1 g AIBN in 2 ml acetone is added to it. The refluxing is continued for two more hours and then part of the solvent is distilled off to obtain a dispersion containing 41% solids by weight.

Particle size from light scattering is found to have 1950 Å average diameter.

EXAMPLE 2

A hydroxy acrylic copolymer is prepared from the following monomers:

|  | Wt. grams | Wt. % |
|---|---|---|
| Butyl methacrylate | 1000 | 50 |
| Hydroxyethyl acrylate | 400 | 20 |
| Methyl methacrylate | 400 | 20 |
| Styrene | 200 | 10 |

One hundred (100) grams tert-butyl perbenzoate is added to the above monomer mixture and the resulting solution added dropwise over a period of two hours to 1400 grams of refluxing methyl amyl ketone under nitrogen. The heating and stirring is continued for half an hour after the addition is complete and then five grams of tert-butyl perbenzoate are added portionwise to the reaction mixture. The reaction mixture is refluxed for an additional ninety (90) minutes and then allowed to cool to room temperature. The molecular weight is determined by Gel Permeation Chromatography ($\overline{M_n}$)=2550.

Sixty-three grams of the above polymer solution, 31 g Cymel 325, 15 g dispersion from Example 1 and 0.3 g phenyl acid phosphate are mixed with 28 ml butyl acetate. The resulting composition is applied by spraying to primed steel panels which are baked at 130° C. for 18 minutes to obtain sag-free coatings with excellent physical properties.

EXAMPLE 3

Sixty-two grams of the stabilizer described in Example 1 and 20 g of the reaction product of equimolar amounts of Epon 828 and methacrylic acid are dissolved in 375 g methyl methacrylate and a solution of 1.3 g AIBN in 5 ml acetone is added to it. The resulting solution is added dropwise to 500 ml refluxing naphtha (bp 120°–140°) under nitrogen with continuous stirring. After the addition is complete, the reaction mixture is stirred for one hour and then a solution of 0.5 g AIBN in 7 ml acetone is added to it. The refluxing is continued for two hours to obtain finely dispersed particles.

EXAMPLE 4

Forty-two grams of the reaction product of poly-(hydroxystearic acid) and 1,4-butanediol diglycidyl ether from Example 1, 3 g hydroxyethyl methacrylate, 6.1 g isocyanatomethyl methacrylate and 0.1 g dibutyltin dilaurate are dissolved in 120 g methyl methacrylate. An acetone solution of 2 g of 2,2'-azobis(2-methylpropionitrile) in 10 ml acetone is added to the above solution and the resulting monomer-initiator solution is added dropwise to 700 ml of refluxing aliphatic solvent (bp 120°–140° C.) with continuous stirring under nitrogen to obtain stable non-settling dispersion.

EXAMPLE 5

Capped poly-(hydroxystearic acid) is prepared, as described in Example 1, by condensation of 2660 g 12-hydroxystearic acid and 100 g stearic acid in 700 g xylene. Part of xylene was removed to obtain a solution containing 82% solids. Two hundred and fifty grams of this capped acid solution are mixed with 24 g Araldite 6010 and 1.5 g Cordova Accelerator AMC TM -2 and the reaction mixture is stirred at 60° C. for 24 hours. The reaction mixture is placed under nitrogen and 0.1 g dibutyltin dilaurate and 18 g isocyanatoethyl methacrylate are added to it. The reaction mixture is stirred at 60° C. for 4 hours.

Thirty five grams of the above product, 10 g hydroxypropyl methacrylate, 10 g Cymel 301, 0.4 g phenyl acid phosphate are dissolved in 90 g methyl methacrylate. A solution of 1.9 g 2,2'-azobis-(2-methylpropionitrile, in 10 ml acetone is added to the above solution and the resulting naphtha under nitrogen with continuous stirring. The heating and stirring is continued for one hour after the addition is complete to obtain uniformly dispersed polymeric particles.

EXAMPLE 6

Thirty-one grams of stabilizer from Example 5, 3.1 g isocyanatoethyl methacrylate and 2.8 g hydroxyethyl methacrylate are dissolved in 110 g methyl methacrylate and a solution of 2 g 2,2'-azo-bis-(2-methyl-propionitrile) in 10 ml acetone is added to the above solution. The resulting monomer-initiator solution is added dropwise to 710 ml of refluxing aliphatic solvent (bp 120°–140° C.) under nitrogen with continuous stirring to obtain a nonaqueous dispersion.

EXAMPLE 7

Thirty-four (34) grams of the stabilizer solution from Example 5, 10 g of glycidyl methacrylate and 6.5 g of azelaic acid are dissolved in 102 g methyl methacrylate and a solution of 1.1 g AIBN in 5 ml acetone is added to the above solution. The resulting solution is added dropwise to 600 ml of refluxing naphtha (bp. 120°–140° C.) under nitrogen with continuous stirring. After the addition is complete, a solution of 0.1 g AIBN in 1 ml acetone is added to the reaction mixture and it is refluxed for two hours to obtain stable dispersed particles.

EXAMPLE 8

Five grams of aluminum flakes (65% in naphtha) are mixed with the paint composition described in Example 2. The resulting formulation is applied by spraying to primed steel panels in three coat applications. The panels are baked at 130° C. for 20 minutes to obtain silver metallic coatings.

EXAMPLE 9

Ten grams of Cymel 303, 10 g hydroxyethyl methacrylate are substituted for amounts of Cymel 301 and hydroxyethyl methacrylate used in Example 1. A stable dispersion is obtained with average diameter of 2100 Å.

EXAMPLE 10

Twenty-five of the dispersion from Example 9 are mixed with 53 g hydroxy polymer from Example 2. 32 g Cymel 325, 0.5 g phenyl acid phosphate, 31 g butyl acetate and 50 g of a millbase prepared from 350 g titanium dioxide, 350 g Acryloid OL-42 (Rohm and Haas Chemical Co.) and 27 g butyl acetate. The resulting formulation is applied by spraying to primed steel panels which are baked at 130° C. for 19 minutes to obtain sag free coatings with excellent hardness, adhesion and solvent resistance.

EXAMPLE 11

Twenty-nine grams stabilizer from Example 5, 2.1 g Desmudur N-100 (Mobay Chemical Co.), 1.8 g hydroxyethyl methacrylate 1,3 g 2,2-azobis-(2-methylpropionitrile) are dissolved in 107 g butyl methacrylate. The resulting solution is added dropwise to 570 ml naphtha refluxing under nitrogen, with continuous stirring. After the addition is complete, 0.1 g dibutyltin dilaurate is added to the reaction mixture and it is refluxed for one hour to obtain the product as finely dispersed polymeric particles.

In view of this disclosure, many modifications of this invention will be apparent to those skilled in the art. It is intended that all such modifications which fall within the true scope of this invention be included within the terms of the appended claims.

We claim:
1. A stable dispersion containing crosslinked polymer particles characterized in that they are formed by reactions comprising addition polymerization of:
 (a) between about 0.5 and about 20 weight percent each of a first and second monomer selected from (i) first and second ethylenically unsaturated monomers each bearing functionality capable of crosslinking reaction with the other or (ii) first and second monomers, wherein said first monomer bears ethylenic unsaturation and functionality capable of crosslinking reaction with other functionality present on said second monomer, said second monomer bearing at least two functional groups of said other functionality and bearing no ethylenic unsaturation; and
 (b) between about 99 and about 60 weight percent of at least one other monoethylenically unsaturated monomer.

in the presence of (I) an organic liquid which is a solvent for the polymerizable monomers, but a non-solvent for the resultant polymer, and (II) polymeric dispersion stabilizer, wherein the reaction is carried out at elevated temperatures such that the dispersion polymer is first formed and then is crosslinked, said dispersion stabilizer comprising, on the average, more than one long hydrocarbon chain and at least one vinyl unsaturation and being the reaction product of:

(A) an adduct bearing pendant hydroxyl groups and being the reaction product of:
  (a) long chain hydrocarbon molecules bearing a carboxyl group and no other reactive group; and
  (b) polyepoxide resin having (i) at least two epoxide groups and (ii) a number average molecular weight of between about 140 and 3000, reacted in amounts so as to provide greater than about 1.0 mole of said long chain hydrocarbon molecules bearing a carboxyl group for each mole of said polyepoxide resin; and (B) ethylenically unsaturated monoisocyanates, wherein said adduct and said ethylenically unsaturated monoisocyanates are reacted in amounts so as to provide at least about 1.0 mole of said monoisocyanate for each mole of said polyepoxide resin employed in said stabilizer formation.

2. A dispersion according to claim 1, wherein said long chain hydrocarbon molecule used to form the stabilizer has a molecular weight of between about 350 and about 3300.

3. A dispersion according to claim 2, wherein said molecule is formed by reacting poly (12-hydrostearic acid) with an alkyl monocarboxylic acid wherein the alkyl group comprises a $C_3$-$C_{17}$ alkyl group.

4. A dispersion according to claim 1, wherein said polyepoxide is a diepoxide having terminal epoxide groups.

5. A dispersion according to claim 1, wherein said monoisocyanate contains monoethylenic unsaturation.

6. A dispersion according to claim 5, wherein said monoisocyanate contains alpha-beta ethylenic unsaturation.

7. A dispersion according to claim 6, wherein said monoisocyanate is isocyanatoethyl methacrylate.

8. A dispersion according to claim 1, wherein the pairs of crosslinking functionalities present on said first and second monomers used to form the particle are selected from the group consisting of (i) hydroxyl and amine (ii) hydroxyl and isocyanate (iii) epoxide and acid; (iv) epoxide and amine; (v) acid anhydride and hydroxyl; (vi) acid anhydride and amine.

9. A dispersion according to claim 8, wherein said particles are formed by reactions comprising free radical addition copolymerization in the presence of hydrocarbon dispersing liquid from about 0.8 to about 10 weight percent of ethylenically unsaturated hydroxy monomers, from about 1.0 to about 12 weight percent of a crosslinking monomer selected from the group consisting of ethylenically unsaturated isocyanates, and from about 98.2 to about 78 weight percent of at least one other copolymerizable monoethylenically unsaturated monomer.

10. A dispersion according to claim 9, wherein said particles are formed by reactions comprising free radical addition copolymerization in the presence of hydrocarbon dispersing liquids from about 0.5 to about 20 weight percent of ethylenically unsaturated hydroxy monomers, from about 99 to about 60 weight percent of at least one other copolymerizable monoethylenically unsaturated monomer, and from about 0.5 to about 20 weight percent of a crosslinking monomer selected from polyisocyanates and amine-aldehyde crosslinking resin having no ethylenic unsaturation.

11. A dispersion according to claim 10, wherein the monomers used to form the dispersed polymer particles are characterized in that said ethylenically unsaturated hydroxy monomer is hydroxyethyl methacrylate, and said crosslinking monomer is a melamine resin.

12. A dispersion according to claim 1, wherein said dispersion liquid is an aliphatic hydrocarbon solvent and the ethylenically unsaturated monomers used to the preparation of said particles are acrylic monomers.

13. Crosslinked polymer particles obtained by removal of said solvent from said dispersion formed in claim 1.

* * * * *